A. K. HARNLY.
LOCKING DEVICE FOR FUEL SUPPLY VALVES.
APPLICATION FILED NOV. 14, 1912.
1,062,154.
Patented May 20, 1913.
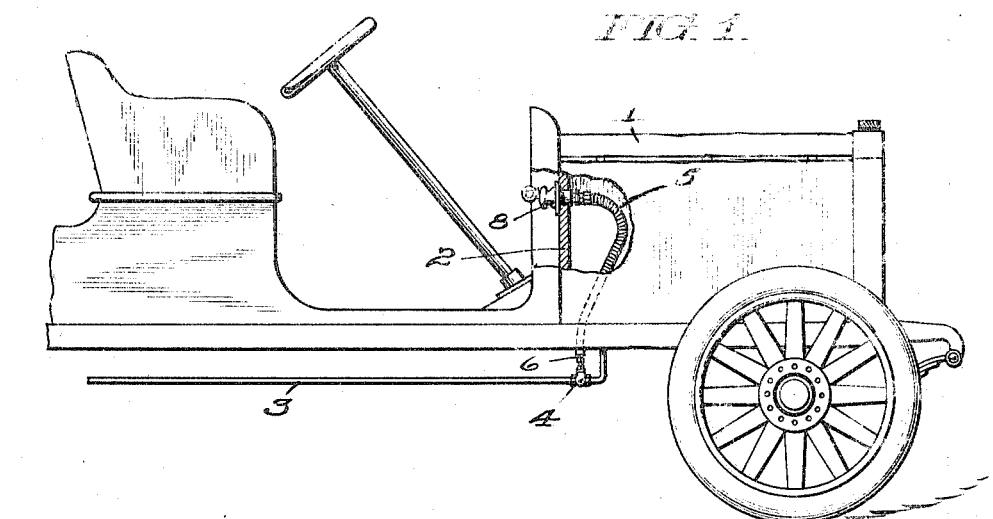
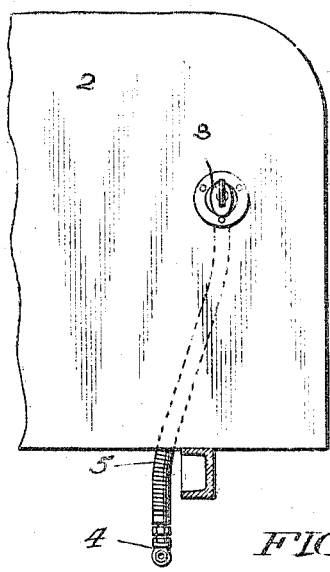
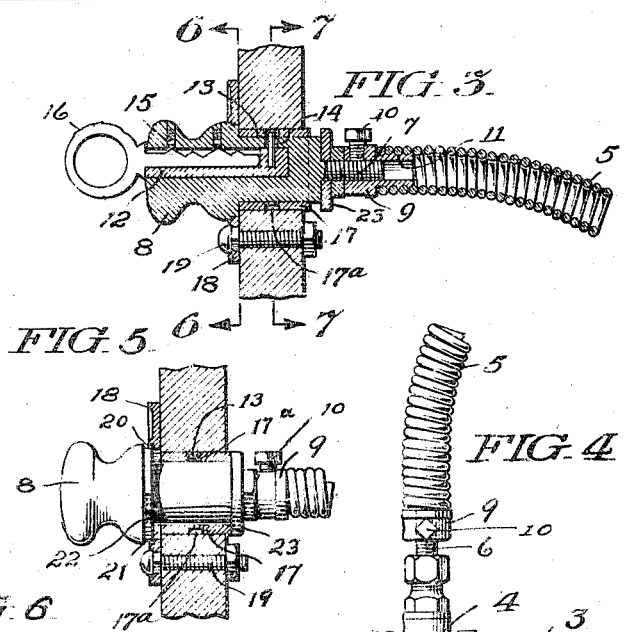
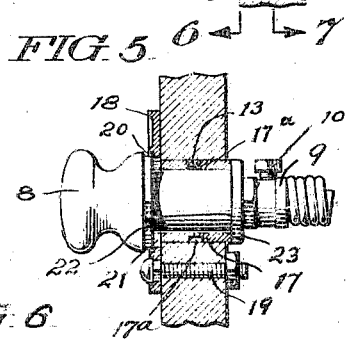
Inventor
ALBERT K. HARNLY,

UNITED STATES PATENT OFFICE.

ALBERT K. HARNLY, OF READING, PENNSYLVANIA.

LOCKING DEVICE FOR FUEL-SUPPLY VALVES.

1,062,154.   Specification of Letters Patent.   Patented May 20, 1913.

Application filed November 14, 1912. Serial No. 731,278.

*To all whom it may concern:*

Be it known that I, ALBERT K. HARNLY, a citizen of the United States, residing at Reading, in the county of Berks and State of Pennsylvania, have invented certain new and useful Improvements in Locking Devices for Fuel-Supply Valves, of which the following is a specification.

My invention relates to improvements in locking devices for fuel supply valves, and it is particularly applicable to motor vehicles in which a liquid fuel is used.

My invention comprises a flexible connection between the fuel control valve and a locking device located on the dash board immediately before the driver, so that the fuel valve may be opened or closed through the locking device, even though the valve is not in alinement with the locking means.

Another feature of my invention is the locking device, the particular construction of which permits the operation of the valve through the medium of the above noted flexible connection.

The invention is more fully described in the following specification and clearly illustrated in the accompanying drawings, in which:—

Figure 1 is side elevation of the forward part of a vehicle with my invention applied thereto. Fig. 2, is an elevation of a section of the dash board, showing the location of the locking device and the flexible connection to the supply valve. Fig. 3 is a central section of the locking device. Fig. 4 is a detail showing the flexible connection attachment to the fuel supply valve. Fig. 5 is a view similar to Fig. 3, but with the locking device shown in side elevation. Fig. 6 is a section on line 6—6 of Fig. 3. Fig. 7 is a section on line 7—7 of Fig. 3.

The numeral 1 designates the forward end of the body and 2 the dash board of an ordinary vehicle. The numeral 3 designates the fuel supply pipe, leading from a source of supply to the carbureter, and 4 designates the fuel supply valve located in said pipe, and which in the present construction may be located at any convenient point and must not necessarily be located immediately below and in vertical alinement with the dash board.

The numeral 5 designates a flexible tubular connection, formed of a tightly coiled wire, and attached to the valve stem 6 at one end, while its other end is attached in like manner to the stem 7 of the locking means 8. This attachment is made by means of a sleeve 9 attached to the respective stems and set screws 10 for holding the sleeves to the stems so that the stems, sleeves and flexible member will turn together, the flexible member being forced over the end of the sleeve which is formed with a series of annular grooves 11 to accommodate three or four convolutions of the coil.

The body 8 of the lock is provided with a suitable key barrel 12 which carries a projecting pin 13 and this pin moves in a slot 14 when the barrel turns, so that, the barrel being located away from the axial center of the body 8, the end of the pin describes an arc that brings it beyond the surface of the body when it reaches the center of its travel. The lock 8 is provided with a set of pin tumblers 15, to be actuated by a key 16, which will permit the barrel to be turned. The sleeve 17 is formed with an internal groove 17ª to engage the locking pin 13.

The body 8 of the lock passes through the sleeve 17, located in an opening in the dash board and formed with a flange 18 which is attached to the inner face of the dash board by bolts 19. The inner face of the flange is dished at 20 to permit the enlarged inner end of the body 8 to seat therein, and, while the dished portion is annular in form, the bottom thereof is rectangular, as shown by numeral 21 in Fig. 5, to accommodate a rectangular shank 22 on the body 8.

When it is desired to close the fuel supply valve for any purpose, the key is inserted in the lock and the turning of the barrel 12 will carry the pin 13 to either side of the center, where its end lies within the outer surface of the body 8, thus releasing the body from the sleeve 17 and permitting the longitudinal forward movement thereof, from the position shown in Fig. 3 to that of Fig. 5, which movement is limited by the washer 23 on the stem 7. When the parts have thus been drawn forward, the shank 22 has been released from its square or rectangular seat 21 in the sleeve 17, and this release will permit the body 8 to be turned sufficiently to close the valve, and the flexible connection 5 between the lock and the valve will permit this turning even though the valve is located at a point out of both horizontal and vertical alinement with the locking device. To secure the valve in said closed position, the body 8 is pushed back to its position in the sleeve until the squared portions meet: the key is turned until the pin 13 is in vertical or locked position, and the key is withdrawn.

Having thus described my invention, I claim:—

1. A locking device for fuel control valves comprising a sleeve formed with an internal annular groove, and a flange formed with a dished surface, a portion of which is rectangular in outline; a body portion formed with a rectangular shank for engagement with the dished portion of the sleeve; a key barrel; a pin carried by said barrel and adapted to travel in the groove in the sleeve whereby the body is locked or unlocked with relation to the sleeve; and a key for turning said barrel.

2. A device of the character described comprising a sleeve formed with an internal annular groove and a flange having a dished surface, a portion of which is rectangular in outline; a body portion having a stem at its inner end, and a rectangular shank for engagement with the dished portion of the sleeve; a key barrel; a pin carried by said barrel and adapted to travel in the groove in the sleeve whereby the body is locked or unlocked with relation to the sleeve; an annularly grooved sleeve secured to the stem of the body portion, and a flexible member secured in the grooves of said sleeve and adapted to rotate therewith.

3. In a locking device for fuel control valves, a sleeve formed with an internal annular groove, a flange, means for securing the flange to a body, said flange having a dished face, a portion of which is rectangular in form; a body adapted to rotate in the sleeve and having an enlarged end formed with a rectangular shank for engagement with the dished surface in the flange; a key barrel in said body provided with a pin adapted for engagement with the internal groove in the sleeve to lock the body against movement with relation to the sleeve, and key operated means for releasing said pin engagement.

In testimony whereof I affix my signature in presence of two witnesses.

ALBERT K. HARNLY.

Witnesses:
 ED. A. KELLY,
 J. O'R. KELLY.